United States Patent
Patel et al.

(10) Patent No.: US 11,934,874 B2
(45) Date of Patent: Mar. 19, 2024

(54) RESOURCE OPTIMIZATION FOR SERVERLESS QUERY PROCESSING

(71) Applicant: Microsoft Technology Licensing, LLC, Redmond, WA (US)

(72) Inventors: Hiren Shantilal Patel, Bothell, WA (US); Shi Qiao, Bellevue, WA (US); Alekh Jindal, Sammamish, WA (US); Malay Kumar Bag, Kirkland, WA (US); Rathijit Sen, Madison, WI (US); Carlo Aldo Curino, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 17/894,628

(22) Filed: Aug. 24, 2022

(65) Prior Publication Data
US 2022/0413914 A1  Dec. 29, 2022

Related U.S. Application Data

(62) Division of application No. 16/697,960, filed on Nov. 27, 2019, now Pat. No. 11,455,192.

(60) Provisional application No. 62/908,336, filed on Sep. 30, 2019.

(51) Int. Cl.
*G06F 9/46* (2006.01)
*G06F 9/48* (2006.01)
*G06F 9/50* (2006.01)
*G06F 16/2453* (2019.01)
*G06N 5/04* (2023.01)
*G06N 20/00* (2019.01)

(52) U.S. Cl.
CPC ............ *G06F 9/5005* (2013.01); *G06F 9/485* (2013.01); *G06F 16/24545* (2019.01); *G06N 5/04* (2013.01); *G06N 20/00* (2019.01); *G06F 2209/501* (2013.01)

(58) Field of Classification Search
CPC .. G06F 9/5005; G06F 16/24545; G06F 9/485; G06F 2209/501
See application file for complete search history.

*Primary Examiner* — Gregory A Kessler
(74) *Attorney, Agent, or Firm* — ArentFox Schiff LLP

(57) ABSTRACT

A serverless query processing system receives a query and determines whether the query is a recurring query or a non-recurring query. The system may predict, in response to determining that the query is the recurring query, a peak resource requirement during an execution of the query. The system may compute, in response to determining that the query is the non-recurring query, a tight resource requirement corresponding to an amount of resources that satisfy a performance requirement over the execution of the query, where the tight resource requirement is less than the peak resource requirement. The system allocates resources to the query based on an applicable one of the peak resource requirement or the tight resource requirement. The system then starts the execution of the query using the resources.

20 Claims, 11 Drawing Sheets

RESOURCE OPTIMIZATION FOR SERVERLESS QUERY PROCESSING

CROSS-REFERENCE TO RELATED APPLICATION(S)

This application is a divisional of U.S. Non-Provisional application Ser. No. 16/697,960, entitled "RESOURCE OPTIMIZATION FOR SERVERLESS QUERY PROCESSING" and filed on Nov. 27, 2019, which claims the benefit of U.S. Provisional Application Ser. No. 62/908,336, entitled "RESOURCE OPTIMIZATION FOR SERVERLESS QUERY PROCESSING" and filed on Sep. 30, 2019, which are expressly incorporated by reference herein in the entirety.

BACKGROUND

The present disclosure relates generally to query processing systems, and more particularly, to serverless query processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Embodiments provide methods, apparatuses, and computer-readable mediums for serverless query processing optimization.

In an aspect, a method of serverless query processing is provided, in a serverless query processing system comprising at least one processor and at least one memory, the at least one memory comprising instructions executed by the at least one processor to process queries. The method includes receiving a query. The method further includes determining whether the query is a recurring query or a non-recurring query. The method further includes predicting, in response to determining that the query is the recurring query, a peak resource requirement during an execution of the query. The method further includes computing, in response to determining that the query is the non-recurring query, a tight resource requirement corresponding to an amount of resources that satisfy a performance requirement over the execution of the query, wherein the tight resource requirement is less than the peak resource requirement. The method further includes allocating resources to the query based on an applicable one of the peak resource requirement or the tight resource requirement. The method further includes starting the execution of the query using the resources.

In another aspect, a device in a serverless query processing system includes at least one processor; and at least one memory in communication with the at least one processor. The at least one memory comprises instructions executed by the at least one processor to process queries including receiving a query; determining whether the query is a recurring query or a non-recurring query; predicting, in response to determining that the query is the recurring query, a peak resource requirement during an execution of the query; computing, in response to determining that the query is the non-recurring query, a tight resource requirement corresponding to an amount of resources that satisfy a performance requirement over the execution of the query, wherein the tight resource requirement is less than the peak resource requirement; allocating resources to the query based on an applicable one of the peak resource requirement or the tight resource requirement; and starting the execution of the query using the resources.

In a further aspect, a serverless query processing apparatus includes a memory and at least one processor coupled to the memory. The at least one processor is configured to process queries including receiving a query; determining whether the query is a recurring query or a non-recurring query; predicting, in response to determining that the query is the recurring query, a peak resource requirement during an execution of the query; computing, in response to determining that the query is the non-recurring query, a tight resource requirement corresponding to an amount of resources that satisfy a performance requirement over the execution of the query, wherein the tight resource requirement is less than the peak resource requirement; allocating resources to the query based on an applicable one of the peak resource requirement or the tight resource requirement; and starting the execution of the query using the resources.

In yet another aspect, a computer-readable medium stores instructions that, when executed by at least one processor of a serverless query processing system, cause the serverless query processing system to process queries including receiving a query; determining whether the query is a recurring query or a non-recurring query; predicting, in response to determining that the query is the recurring query, a peak resource requirement during an execution of the query; computing, in response to determining that the query is the non-recurring query, a tight resource requirement corresponding to an amount of resources that satisfy a performance requirement over the execution of the query, wherein the tight resource requirement is less than the peak resource requirement; allocating resources to the query based on an applicable one of the peak resource requirement or the tight resource requirement; and starting the execution of the query using the resources.

In a further aspect, a query method is provided in a query system comprising at least one processor and at least one memory, the at least one memory comprising instructions executed by the at least one processor to run queries. The query method includes transmitting a query to a serverless query processing system. The query method further includes skipping transmission, to the serverless query processing system, of an amount of resources required for an execution of the query, wherein the skipping is configured to cause the serverless query processing system to determine and allocate the amount of resources required for the execution of the query. The query method further includes receiving results of the execution of the query from the serverless query processing system.

In another aspect, a query device includes at least one processor and at least one memory in communication with the at least one processor. The at least one memory comprises instructions executed by the at least one processor to run queries including transmitting a query to a serverless query processing system; skipping transmission, to the serverless query processing system, of an amount of resources required for an execution of the query, wherein the skipping is configured to cause the serverless query processing system to determine and allocate the amount of resources required for the execution of the query; and receiving results of the execution of the query from the serverless query processing system.

In a further aspect, a query apparatus includes a memory and at least one processor coupled to the memory. The at least one processor is configured to run queries including transmitting a query to a serverless query processing system; skipping transmission, to the serverless query processing system, of an amount of resources required for an execution of the query, wherein the skipping is configured to cause the serverless query processing system to determine and allocate the amount of resources required for the execution of the query; and receiving results of the execution of the query from the serverless query processing system.

In yet another aspect, a computer-readable medium stores instructions that, when executed by at least one processor of a query system, cause the query system to run queries including transmitting a query to a serverless query processing system; skipping transmission, to the serverless query processing system, of an amount of resources required for an execution of the query, wherein the skipping is configured to cause the serverless query processing system to determine and allocate the amount of resources required for the execution of the query; and receiving results of the execution of the query from the serverless query processing system.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
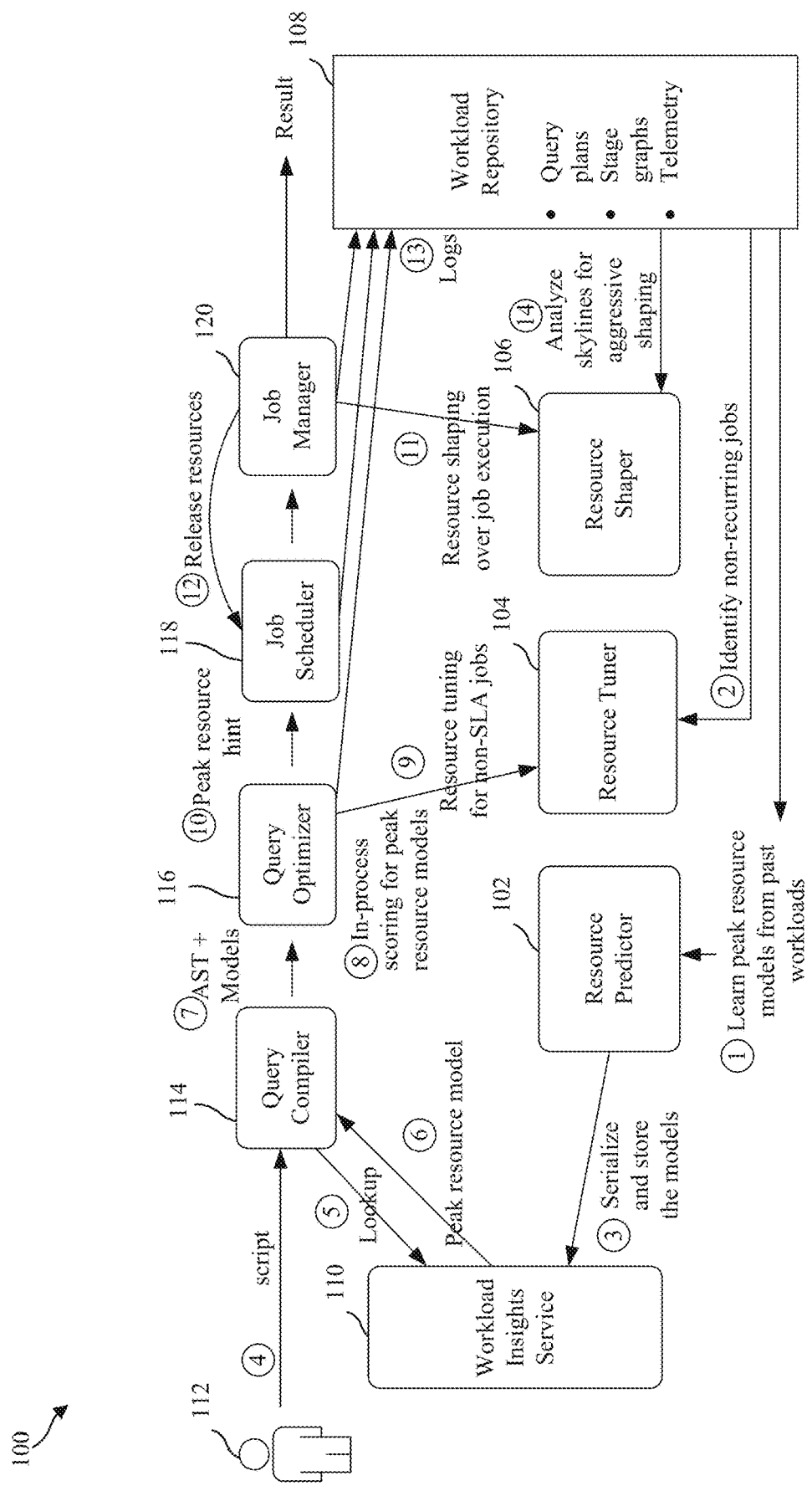
FIG. 1 is a block diagram of an example serverless query processing system, according to aspects of the present disclosure.

The detailed description set forth below in connection with the appended drawings is intended as a description of various configurations and is not intended to re-present the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present aspects provide a serverless query processing system that uses machine learning models for predicting peak resource requirements in recurring queries using features from a query plan and input data. Some aspects further provide a tuning algorithm for computing tight allocations (the minimum possible allocation that does not cause any noticeable degradation in performance) in ad-hoc queries by simulating the scheduling behavior of a query plan at compile time. Further, in some aspects, an adaptive algorithm is used to re-compute a peak (or tight) allocation as the query execution progresses and to release any redundant resources. Accordingly, in the present aspects, an end-to-end resource optimization system provides offline training and extensions to compiler, optimizer, scheduler, and job manager, for automatic resource optimization.

A serverless query processing system automatically provisions a set of resources for a query, without having users manage the resources for their computation tasks. In an aspect, a resource may refer to a computing resource, such as a virtual machine (VM), memory, etc. In an aspect, for example, a resource may refer to a "container" which is a collection of processing cores and RAM. In an aspect, for example, a container may provide the functionality of a "light" VM, which is a VM that can be started and stopped cheaply/quickly. A serverless query processing system may provide, for example, an exabyte-scale big data analytics platform where the users specify declarative queries and the system runs the queries in a massively distributed environment. A serverless query processing system may include an engine that decides the number of containers (also known as tokens) to use for each job. A serverless query processing system may process, for example, hundreds of thousands of jobs per day using hundreds of thousands of virtual machines. In an aspect, for example, a job may be an analytical job such as building an index of information downloaded from the Internet, computing a statistical function (e.g., average) of numerical data, etc.

Turning now to the figures, examples are depicted with reference to one or more components and one or more methods that may perform the actions or operations described herein, where components and/or actions/operations in dashed line may be optional. Although the operations described below in one or more of the methods are presented in a particular order and/or as being performed by an example component, the ordering of the actions and the components performing the actions may be varied, in some examples, depending on the implementation. Moreover, in some examples, one or more of the described actions, functions, and/or components may be performed by a specially-programmed processor, a processor executing specially-programmed software or computer-readable media, or by any other combination of a hardware component and/or a software component capable of performing the described actions or functions.

FIG. 1 is an example end-to-end resource optimization and query processing system 100 including a resource predictor 102 that predicts the maximum required resources for recurring jobs, a resource shaper 106 that dynamically shapes the resource allocation during the execution of a job based on the query execution graph, and a resource tuner 104 that finds a tight resource allocation (corresponding to an amount of resources that satisfy a performance requirement over the execution of the query) for non-recurring jobs, according to some present aspects. The system 100 first identifies recurring and non-recurring workloads from a workload repository 108 that includes query plans, stage graphs, and associated telemetry from previous job executions. Using this data, the system 100 learns the models for the resource predictor 102 for each recurring job at Step 1. Also, the system 100 uses the non-recurring jobs to trigger the resource tuner 104 at Step 2. The models for the resource predictor 102 are serialized and stored into a workload insight service 110 at Step 3. For each job (e.g., analytical job) that gets submitted by a user 112 at Step 4 (e.g., by a person or an application), a query compiler 114 looks up the insight service 110 at Step 5, and loads the resource predictor model for that job at Step 6. The query compiler 114 passes the compiled abstract syntax tree (AST) along with the predictor model to a query optimizer 116 at Step 7, which infers the peak resource requirement using the predictor model at Step 8. For non-recurring jobs, the query optimizer 116 invokes the resource tuner 104 at Step 9. The query optimizer 116 passes the peak resource requirement hints, obtained either from the resource predictor 102 or the resource tuner 104, to a job scheduler 118 at Step 10, which schedules the job with the peak resource requirement. Once the job starts executing, a job manager 120 invokes the resource shaper 106 at Step 11, and in case of excess resources, releases the excess resources via the job scheduler 118 at Step 12. Finally, the logs from each of the query processing components (the query compiler 114, the query optimizer 116, the job scheduler 118, and the job manager 120) are collected into the workload repository 108 at Step 13 to train the models (e.g., the peak resource requirement models for the resource predictor 102) and further improve the future decisions. In an aspect, the resource shaper 106 may also mine the resource skylines from the workload repository 108 and use them during resource shaping.

Accordingly, the system 100 continuously learns from the past workloads and may therefore optimize performance for different subsets of the workload and fix errors in the early predictions. In some aspects, the system 100 is fully automatic and does not require any manual supervision or tuning from the users 112. In some aspects, the system 100 may provide compiler flags where the users 112 may choose to explicitly opt-in or opt-out of resource optimization on a per job basis. In some aspects, if the models for the resource predictor 102 predict an allocation lower than the actual peak, the system 100 may split the past workload into "training," "validation," and "test" sets, and apply filters for models that perform poorly on the "validation" set. Alternatively and/or additionally, the system 100 may consider the different subsets of workloads from different customers (e.g., virtual clusters), and filter out the workload subsets (or customers) that do not benefit from resource optimization. This is because either the workloads may be too ad-hoc in nature or the customer has their own custom machinery for resource optimizations. Alternatively and/or additionally, the job manager 120 may observe the actual peak resource requirements and inform the workload insights service 110 to disable a model that produces incorrect predictions. Alternatively and/or additionally, the system 100 may retrain the predictor models, e.g., every day, for an initial deployment phase, thereby fixing errors in model predictions with newer training data. Alternatively and/or additionally, the resource shaper 106 may be made more resilient by adding the previously seen skyline in similar jobs and using that, in combination with the stage graph, to estimate the remaining peak needed for the job. Alternatively and/or additionally, the resource shaper 106 may use more accurate cost estimates of each stage as well as run the actual job manager code in simulation mode (wherever possible) to mimic the runtime behavior more accurately. Further details of the operation of the components of the system 100 are provided below.

In an aspect, the system 100 implements serverless query processing to shift the responsibility of resource allocation from the users 112 to query engines. Conventional serverless query processing includes estimating the fine-grained resource requirements for each query at compile time. However, the estimates in a conventional query optimizer are often off by orders of magnitudes, in particular in big data systems. Further, allocating and de-allocating resources is expensive, making a change in the allocation for a query undesirable. Additionally, a resource change may trigger query plan changes to use the new set of resources, which may adversely affect the overall performance. Yet further, given that a query runs for a relatively small time duration, there is not much room for adjusting the resources. In particular, if the resources are under-allocated, query performance may have suffered already before any resource adjustments could be applied.

A conventional serverless query processor may address some of these issues by relying on a user-specified resource limit, e.g., the maximum number of tokens that a query may use, and reserves them as guaranteed resources before starting the query execution. However, users rarely make an informed decision when specifying the maximum tokens.

Figure 2:
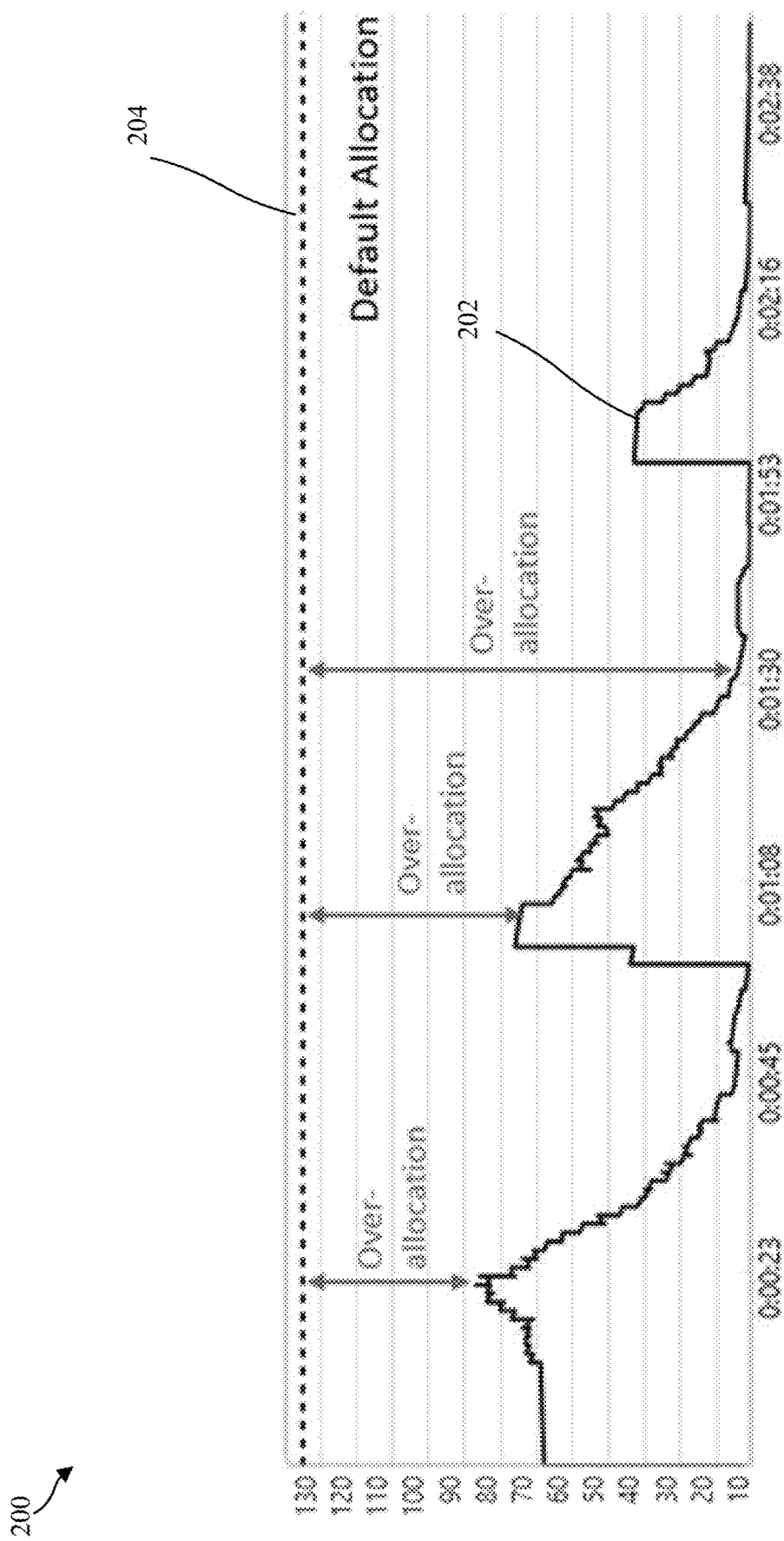
FIG. 2 is an example default resource allocation for an example job.

For example, referring to FIG. 2, an example token usage skyline 200 over time in a typical example job indicates a large gap between the user supplied tokens (corresponding to a default allocation 204 requested by the user 112), and the actual token consumption 202. In FIG. 2, the resource consumption and the resulting gap between allocated and used tokens changes significantly as the query progresses. Over-provisioning of tokens results in high queuing latencies and resource wastage. In case of under-allocation, a serverless query processor may attempt to opportunistically use spare tokens. However, under-allocation may still result in poor and unpredictable query performance. In contrast, in some present aspect, the system 100 in FIG. 1 properly sizes the tokens for each recurring job, thus leading to opportunistic capacity (bonus tokens) for speeding up existing jobs and spare capacity for newer jobs, thereby significantly improving the overall system efficiency.

In some aspects, for big data, instead of treating jobs as a black box model, the system 100 determines the resource requirements of a job based on the characteristics of each job or how the resource requirements change in different stages of a job and/or over time. In some aspects, instead of using a static resource allocation, the system 100 uses resource modeling and optimization to build resource cost models for selecting resources for a given query plan and adapt over the course of job execution (e.g., during runtime). In some aspects, the system 100 allows for dynamic re-allocation of resources using a lightweight simulator that uses cost estimates of each stage from the query optimizer and replays the vertex scheduling strategy. In case the cost estimates are inaccurate, the system 100 may fix them separately using learned cost models. In some aspects, the system 100 finds the optimal resources for each operator in the query plan as part of query optimization by considering a transformation of operators into a stage graph and how cost varies with varying resources on the stage graph.

In an aspect, for example, the system 100 provides built-in resource optimization for systematic resource allocation for serverless query processing. In an aspect, for a large fraction of production workloads that are recurring in nature, the system 100 predicts a peak allocation for recurring jobs using machine learning models built from the telemetry of past jobs (e.g., query plans, runtime statistics, etc.). Further, for non-recurring jobs (e.g., ad-hoc jobs, non-Service Level Agreement (SLA) jobs, etc.), the system 100 computes a tight allocation which is the minimum possible allocation that does not cause noticeable degradation in performance. The system 100 may dynamically adapt the allocations based on the query execution graph. For this, the system 100 re-computes a new peak or tight allocation expected for the remainder of the query as the query execution progresses. At any time, if the newer computed allocation is lower than the current allocation, the system 100 releases the excess resources.

Figure 3A:
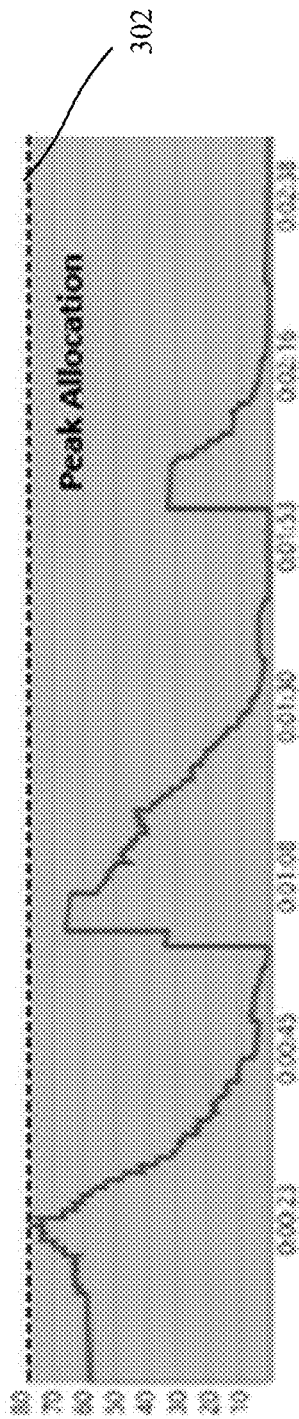
FIGS. 3A, 3B, and 3C are examples of alternative resource allocations for the example job in FIG. 2, according to aspects of the present disclosure.
Figure 3B:
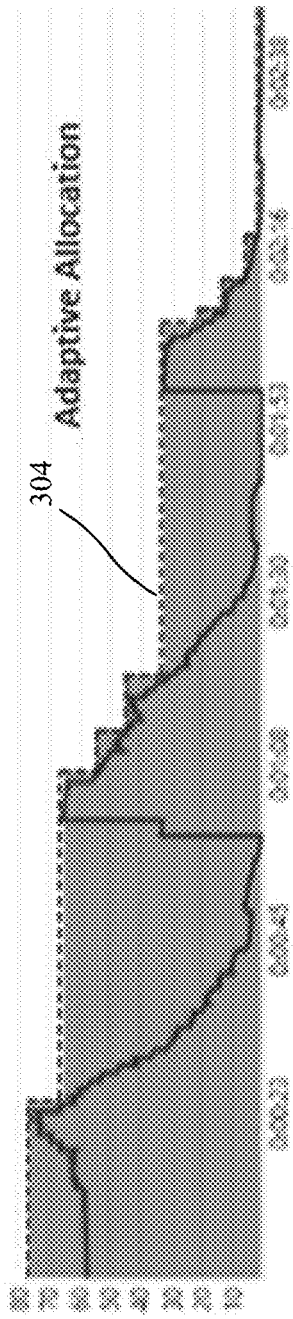
Figure 3C:
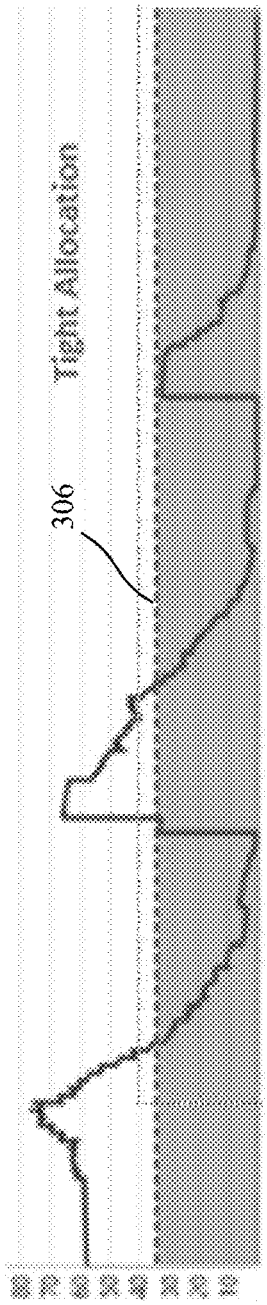

In an aspect, for example, the system 100 begins query processing using a peak allocation or a tight allocation depending on whether a job is recurring or not. FIGS. 3A, 3B, and 3C respectively illustrate a peak allocation 302, an adaptive allocation 304, and a tight allocation 306 for the example job in FIG. 2. As compared to FIG. 2, the area under the resource curve (e.g., the total resource consumption) in FIGS. 3A, 3B, and 3C is significantly reduced.

As compared to conventional query processing systems, the system 100 is plan-aware for determining the resource allocation, improves resource efficiency without degrading the query performance, and allows for resource optimizations to be automatic and transparent to the users.

Figure 4:
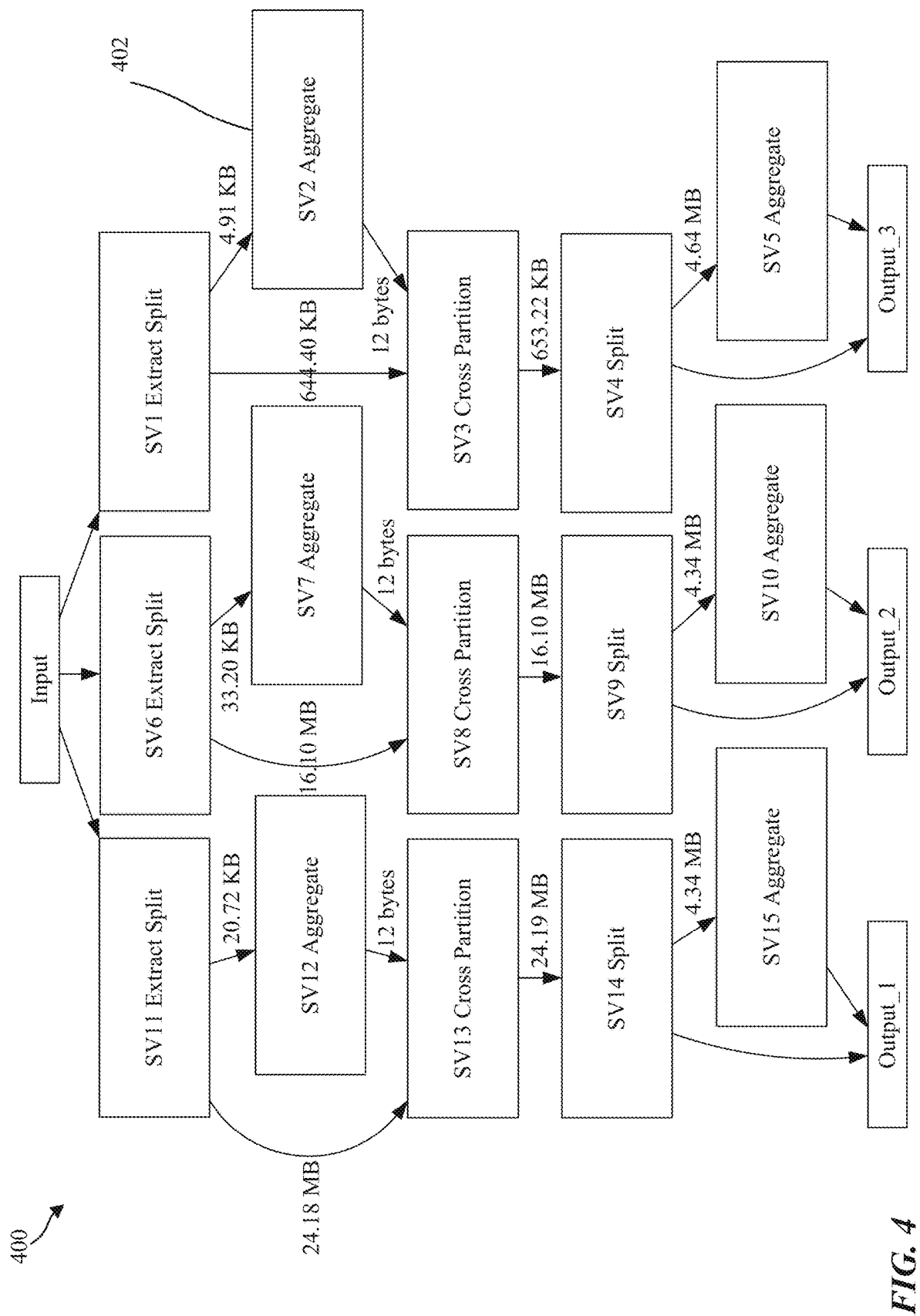
FIG. 4 is an example Directed Acyclic Graph (DAG) of an example job, according to aspects of the present disclosure.

Referring to FIG. 4, an example job includes stages 402 that are connected in a directed acyclic graph (DAG) 400 with the data flow being from top to bottom. Each stage 402 includes one or more physical operators that may be processed locally in a single container. Instances of a stage 402 (also referred to as vertices) may process different partitions of data in parallel. One non-limiting example aspect may consider maximum degree of parallelism (also referred to as tokens) as the unit of resource. However, the present aspects are applicable to other dimensions such as container size, virtual machine (VM) type, etc.

In conventional query processing systems, a job may reserve a user-provided maximum number of tokens (the allocated resources) before the job starts executing. In this case, for example, 40% to 60% of the jobs may be over-allocated by as much as 1000×, indicating significant opportunities for right-sizing the resource allocation. In some cases, for example, 70% to 85% of jobs may be over-allocated with respect to their average resource consumption. As such, there is a significant gap between the peak and average resource consumption in conventional resource processing systems that use a user-provided maximum number of tokens. Reducing over-allocation improves the operational efficiency in big data analytics. Further, guaranteed resources may be freed up and used to submit more jobs. Additionally, the queuing time of jobs may be reduced by having the jobs request for less resources. Finally, the user experience may be improved by automating a corresponding parameter in jobs. In an aspect, for example, tight allocation may increase the allocation for significantly under-allocated jobs. This not only improves the job performance but also makes job performance more predictable, since right-sizing the allocation reduces the dependence on opportunistic resource allocation. Accordingly, some present aspects provide resource prediction to enable peak allocation, resource shaping to enable adaptive allocation, and resource tuning to enable tight allocation. Further details are provided below.

Resource Predictor

Referring back to FIG. 1, in an aspect, the resource predictor 102 predicts the peak resources (e.g., peak allocation 302 in FIG. 3A) that would be required in a recurring job, e.g., jobs that are executed periodically with changing inputs and parameters. In an aspect, for example, recurring jobs may include jobs that process logs from one or more products and drive business decisions. Since the structure of the job remains the same, the peak resource requirements may be modeled as a function of the inputs and parameters. In an aspect, the system 100 is plan-aware and identifies the recurring jobs. In an aspect, for example, the system 100 uses a hash of the logical query plan of the job to identify recurring instances. In some aspects, since the inputs and the parameters may change, the system 100 may ignore the inputs and the parameters in the hash. Such a hash (also referred to as a signature) may be used for identifying common sub-expressions.

For model training, in one non-limiting aspect, a job may be identified as recurring if the corresponding hash value appears at least twice in the training dataset. For each such hash value, a model is trained using feature values and actual peak resource usage information from jobs with that hash value. During prediction, feature values from the target job are used to predict peak resource usage using the model trained for that hash value. If the model does not exist, either because this is a different job or because the hash value appeared only once in the training set, a default value requested/provided by the user may be used.

For each recurring job, the system 100 may consider different data characteristics such as cardinality, plan characteristics such as parameters, and optimizer-derived characteristics such as number of partitions, plan cost, etc. In an aspect, since the peak resource requirement is predicted at compile-time, only the features that are available at compile-time for each recurring job are considered, and runtime characteristics such as actual execution time are excluded.

In an aspect, the system 100 may consider multiple signatures in order to improve coverage of the models. For example, instead of using the hash of the entire query plan, the system 100 may consider a relaxed hash that only includes the root operator and leaf-level inputs. Queries having the same relaxed hash may have the same inputs but different plan shapes, which may indicate their peak resource requirements. In an aspect, the system 100 captures plan characteristics such as plan costs, partitions, etc., which may be indicators of resource requirements. The system 100 may also consider other types of relaxed hashes to group similar jobs and improve the coverage of the models.

For model selection, the system 100 may consider regression models such as Linear Regression, AdaBoost Regression, Extra-Trees Regression, Gradient Boosting Regression, and Random Forest Regression. For example, the system 100 may implement linear regression with standard normalization.

During model training, in an aspect, each recurring job in the training dataset may be classified into multiple groups, one for each hash value computed for the job. Then, models are built for each group. During prediction, for each job, hash values are considered in succession, stopping when the corresponding model is found which is then used to predict the peak resource usage/requirement for the job. If no model is found, the default value is used.

Accordingly, by creating one model per recurring job, the resource predictor 102 may accurately predict the peak resource usage/requirement for jobs. The resource predictor 102 may scale gracefully with the changes in data characteristics such as input sizes, etc.

Resource Shaper

In an aspect, once a job starts executing, the resource shaper 106 dynamically shapes the resource allocation based on the query execution graph (e.g., as in FIG. 3B). For example, in an aspect, the resource shaper 106 estimates the peak resource usage/requirement in the remaining of the job execution, and any excess resources are released. In an alternative aspect, instead of only releasing resources, the resource curve may be used to both release and request resources. As compared to requesting resources, releasing resources is a more lightweight operation without incurring the request overheads on the job manager 120 or the queuing overheads on the job execution. Therefore, the resource shaper 106 may passively inform the job manager 120 of the spare resources which may be recycled at any time. To detect the peak for the remaining query, the resource shaper 106 may invoke a query graph-based peak resource requirement estimator at any point during query execution, and excess resources may be released via communication with the job manager 120 and the job scheduler 118.

In an aspect, for example, the resource shaper 106 may estimate the peak resources for the remaining of the job by converting a job graph into one or more trees. For example, the resource shaper 106 may perform "tree-ification" by removing one of the output edges of the Spool operators in the job graph, since Spool is the only operator that may have more than one consumers. For example, the resource shaper 106 may remove one of the output Spool edges since a stage containing the Spool operator cannot run concurrently with its consumer stages. In an aspect, the resource shaper 106 removes the edge with the consumer that has the maximum in-degree. In case of a tie, the resource shaper 106 may select a consumer at random. In an aspect, if the maximum in-degree of spool consumers is one, then no edge can be removed since the sub-graph is already a tree.

Figure 5:
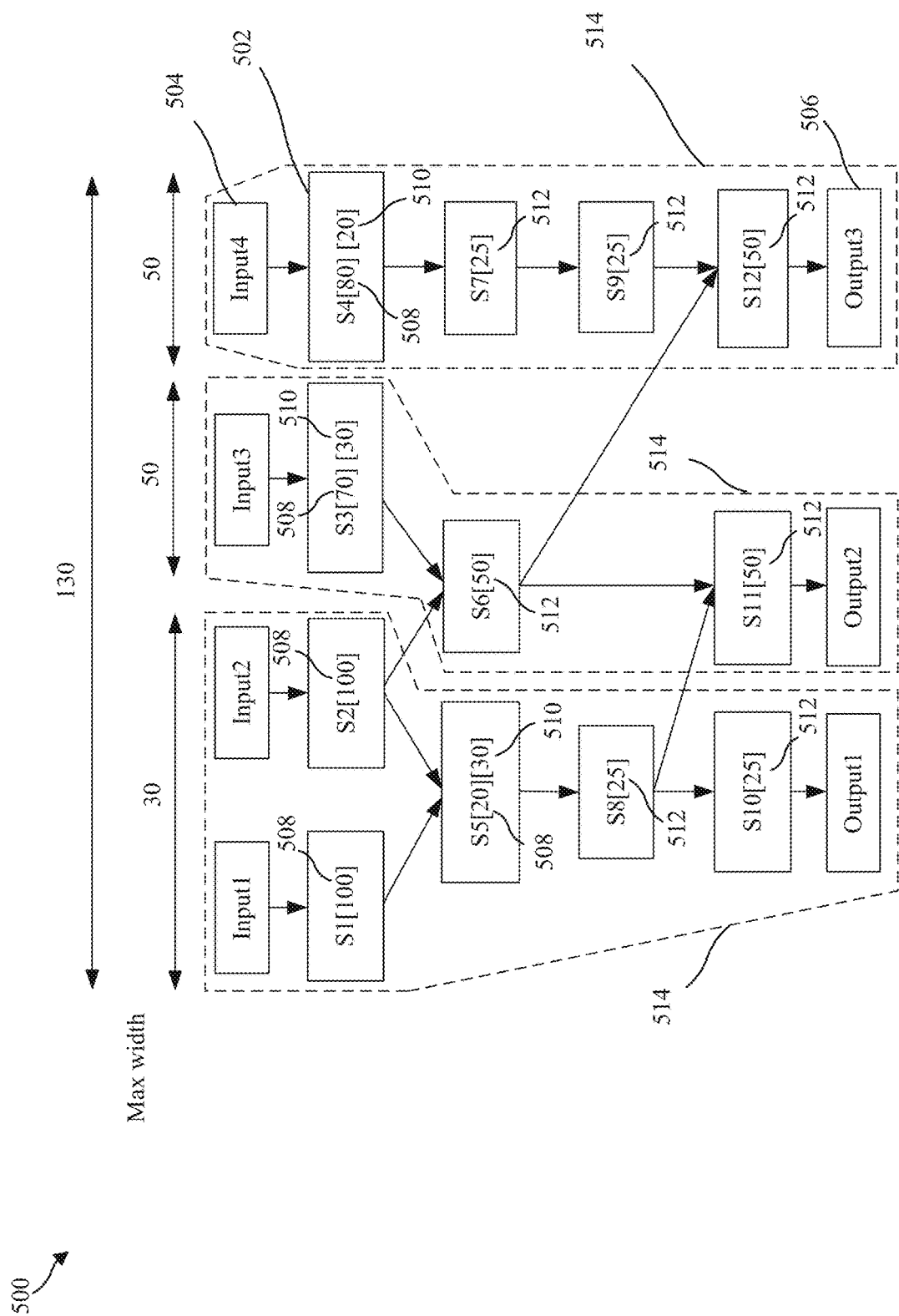
FIG. 5 is an example of shaping resources in a DAG of an example job, according to aspects of the present disclosure.

In an aspect, for example, the resource shaper 106 may determine a max-cut on the DAG of a job. Referring to FIG. 5, for example, a stage graph 500 (e.g., DAG) of an example job may include twelve stages 502 over four inputs 504 and produce three outputs 506. In this example, stages S2, S6, and S8 have spool operators, since they have two downstream consumers each. To convert the DAG into a set of trees 514, the resource shaper 106 may remove one of the outgoing edges of the spools. For S8, for example, the resource shaper 106 may remove the edge with S11, since this edge has a higher in-degree than S10. For S2 and S6, the resource shaper 106 may pick an edge at random since their consumers have equal in-degrees of 2. This results in three trees 514 corresponding to the three outputs 506. In FIG. 5, the number of vertices are indicated in square brackets for each of the stages 502. In an aspect, for example, at a particular point in execution in FIG. 5, the numbers 508 in brackets denote the completed vertices, the numbers 510 in brackets denote the running vertices, and the numbers 512 in brackets denote vertices that are yet to be scheduled. Given this particular point in execution, the resource shaper 106 may compute the maximum remaining peak resource requirement by computing the maximum width of each of the trees 514, which is 30, 50, and 50 respectively, and then takes the sum of the individual tree widths, e.g., 130. If the job started with, for example, 200 containers, then the system 100 may release 70 containers at this point in execution.

The below example code provides an example implementation of the resource shaper 106 in an aspect.

| Algorithm 1: Resource Shaper | |
| --- | --- |
| Input : | stage graph G, stage vertices V, current resources R, completion state W |
| Output: | updated priorities P |
| 1 | T = Treeify (G) |
| 2 | maxRemaining = Null |
| 3 | foreach root ∈ T.roots do |
| 4 |    maxRemaining.Add(RemainingPeak (root, V, W) ) |
| 5 | if maxRemaining < R then |
| 6 |    GiveUpResources (R− maxRemaining) |

| Algorithm 2: RemainingPeak | |
| --- | --- |
| Input : | root stage s, stage vertices V, completing state W |
| Output: | updated priorities P |
| 1 | if W[s] ≥ V[s] then |
| 2 |    return Null |
| 3 | childResources = Null |
| 4 | foreach child ∈ s.ChildStages do |
| 5 |    childResources.Add(RemainingPeak(child, V, W) |
| 6 | return Max (Resources (s) , childResources) |

In the above example code, Algorithm 1 is the control loop of the resource shaper 106 that first converts the job graph into tree(s) and then recursively computes the remaining peak resource requirement in each of the tree root nodes. If the total remaining peak resource requirement is less than the current resources, then the job manager 120 makes the call to give up excess resources. Further, Algorithm 2 finds the remaining peak resource requirement by iteratively adding the peak resource requirements of the children of each parent node (Lines 3-5 in the above example code), and returns the max of the children and parent peak resource requirements (Line 6 in the above example code). Accordingly, the peak resource requirement estimation finds the max-cut in each of the trees generated from the job graph and takes the sum.

Resource Tuner

In an aspect, the resource tuner 104 finds the tight allocation (e.g., as in FIG. 3C) for non-recurring jobs, e.g., jobs that are not SLA sensitive and do not have a resource predictor anyways. In an aspect, for example, almost 40% of the workloads may be non-recurring. In an aspect, the resource tuner 104 is plan-aware and hence may also be used for increasing the allocation to improve performance in under-allocated jobs. In an aspect, for example, starting from an original resource-cost curve, the resource tuner 104 may modify the resource-cost area and either tune cost with extra resources or tune resources for extra cost.

Figure 6:
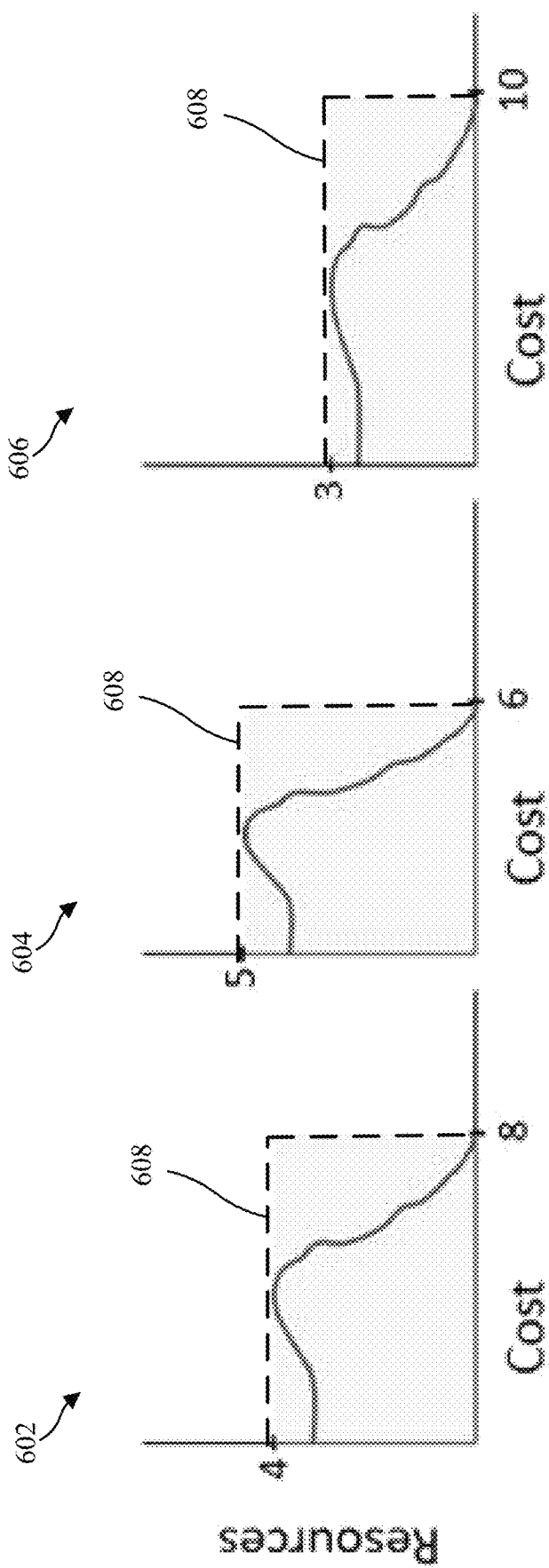
FIGS. 6A, 6B, and 6C are examples of resources before and after resource tuning, according to aspects of the present disclosure.

For example, referring to FIGS. 6A, 6B, and 6C, respectively, given an original resource-cost skyline 602 of a typical job (with the cost being in terms of job latency), the resource tuner 104 may increase the resources up to a limit to obtain a first modified resource-cost skyline 604 if it helps to reduce the cost of the job, or decrease resources to obtain a second modified resource-cost skyline 606 if the increase in cost is within a limit. In either case, the resource tuner 106 attempts to decrease the total area of the resource-cost rectangle 608. For example, in FIGS. 6A, 6B, and 6C, the first modified resource-cost skyline 604 causes 25% increase in resources for a 25% reduction in cost, while the second modified resource-cost skyline 606 causes 25% decrease in resources for a 25% increase in cost. In both cases, the total area of the resource-cost rectangle 608 decreases from 32 to 30, and hence either of these may be valid resource tunings. In such a case, the resource tuner 104 may choose cost reduction over resource reduction and pick the first modified resource-cost skyline 604 over the second modified resource-cost skyline 606.

The below example code provides an example implementation of iterative tuning in the resource tuner 104 in an aspect.

| Algorithm 3: Resource Tuner |
| --- |
| Input : stage graph G, stage vertices V, stage costs C, default resources R, cost per resource threshold α |
| Output: tight allocation $A_{tight}$ |
| 1  P = { } |
| 2  AssignPriorities (G, P, G.root) |
| 3  origCost = SimSchedule (G.stages, P, V, C, R) |
| 4  $A_{tight}$ = R |
| 5  while true do |
| 6  \|   R' = Neighbors ($A_{tight}$) |
| 7  \|   nextCost = —INF |
| 8  \|   nextR = Null |
| 9  \|   foreach resource r ∈ R' do |
| 10 \|   \|   simCost = SimSchedule (G.stages, P, V, C, r) |
| 11 \|   \|   costOverhead = (simCost − origCost)/ origCost |
| 12 \|   \|   resourceOverhead = (r − R)/ R |
| 13 \|   \|   if costOverhead ≤ α && resourceOverhead ≤ α && simCost*r< nextCost*nextR then |
| 14 \|   \|   \|   nextR = r |
| 15 \|   \|   \|   nextCost = simCost |
| 16 \|   if nextR = = Null then |
| \|   \|   // Return current resource since no better neighbors exist |
| 17 \|   \|   return $A_{tight}$ |
| 18 \|   $A_{tight}$ = nextR |

In the above example code, Algorithm 3 finds the tight allocation for a job. Specifically, the resource tuner 104 simulates the job scheduler 118 to estimate the same sequence of vertex executions as would happen in the real environment. Algorithm 3 starts with an initial set of resources and iteratively (Lines 5-18 in the above example code) finds the alternate resource allocation that would improve the area of the resource-cost rectangle 608 while keeping cost and resource overheads within a threshold α (Lines 13-15 in the above example code). In an aspect for example, the threshold may be specified by the user 112. In an alternative aspect, the threshold may be a default threshold, e.g., 10%. To estimate the cost with a candidate resource allocation, Algorithm 3 simulates two components from the job manager 120: (i) priority assignment for different stages in the job graph (Line 2 in the above example code), and (ii) priority queue based on execution of different vertices in each stage (Lines 3 and 10 in the above example code). Further details are provided below. In an aspect, although Algorithm 3 iterates in a hill-climbing manner, Algorithm 3 may be adapted to other exploration strategies, e.g., simulated annealing or even exhaustive search if the resource space is not too large.

The below example code provides an example implementation of the priority assignment in the iterative tuning of Algorithm 3 in the resource tuner 104 in an aspect.

| Algorithm 4: AssignPriorities |
| --- |
| Input : stage graph G, Priorities P, current stage s |
| Output: updated priorities P |
| 1  priority = 0 |
| 2  if s.ChildStage/= Null then |
| 3  \|   childPriorities = [ ] |
| 4  \|   foreach child ∈ s.ChildStages do |
| 5  \|   \|   AssignPriorities (G, P, child) |
| 6  \|   \|   childPriorites.Add(P[child]) |
| 7  \|   priority = childPriorities.Max + 1 |
| 8  P[s] = priority |

In the above example code, Algorithm 4 implements the priority assignment logic that emulates the job manager 120. In an aspect, for example, the leaf stages are assigned a priority of zero (e.g., most important), and all other stages are assigned a priority of one more than the maximum priority of any respective child stages. Such a priority assignment ensures that all child stages have been executed before the parent stage starts executing.

Figure 7:
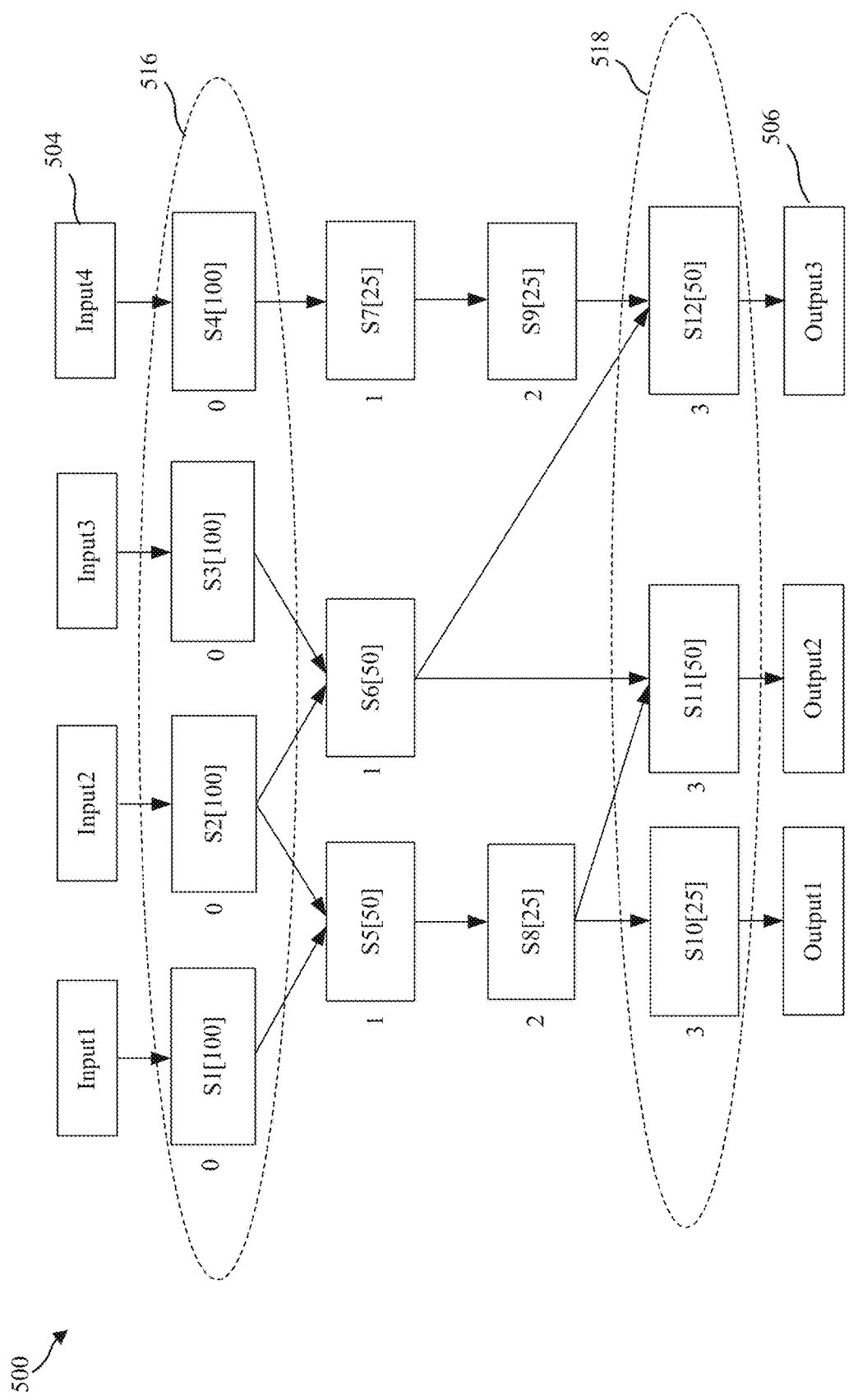
FIG. 7 is an example of priority assignment in a DAG of an example job, according to aspects of the present disclosure.

Referring to FIG. 7, for example, in an aspect, the resource tuner 104 may perform priority assignment over the example job graph 500 in FIG. 5, starting from a priority zero for all input stages 516 and ending with a priority 3 for all output stages 518.

Finally, the resource tuner 104 may estimate the cost of a job with different resource allocations by simulating the execution of different stages in the job manager 120. For example, in an aspect, the resource tuner 104 may put all stages, along with their priorities in a priority queue, and schedule the stage at the top of the queue as soon as resources are available.

The below example code provides an example implementation of cost simulation in the resource tuner 104 in an aspect.

| Algorithm 5: SimSchedule |
| --- |
| Input : graph stages S, Priorities P, stage vertices V, stage costs C, resources r |
| Output: cost of the stage graph from simulated scheduling |
| 1  queue = PriorityQueue ( ) |
| 2  foreach stage s ∈ S do |
| 3  \|   queue.Insert(s, P[s]) |
| 4  cost = 0 |
| 5  running = { } |
| 6  stage_progress = { } |
| 7  while queue.empty( ) = = false do |
| 8  \|   while Resources (running) < r do |
| 9  \|   \|   queued = false |
| 10 \|   \|   foreach s' ∈ queue.getHighestPriority( ) do |
| 11 \|   \|   \|   dependenciesSatisfied = true |
| 12 \|   \|   \|   foreach d ∈ s'.Dependencies do |
| 13 \|   \|   \|   \|   if stage_progress[d] < V[d] then |
| 14 \|   \|   \|   \|   \|   dependenciesSatisfied = false |
| 15 \|   \|   \|   if dependenciesSatisfied then |
| 16 \|   \|   \|   \|   running.Add(< s', C[s'] >) |
| 17 \|   \|   \|   \|   stage_progress[s'] += 1 |

-continued

Algorithm 5: SimSchedule

```
18   |  |  |     |   if stage_progress[s'] ≥ V[s'] then
19   |  |  |     |    | queue.remove(s')
     |  |  |     |    —
20   |  |  |     |   queued = true
21   |  |  |     |   break
     |  |  |     —
     |  |  —
22   |  |  if /queued then
23   |  |   |  break
     |  |  —
     |  —
24   |  c_min = GetMinCost (running)
25   |  running' = { }
26   |  foreach run ∈ running do
27   |   |  if run.cost > c_min then
28   |   |   |  running'.Add(<run.stage,run.cost-c_min>)
     |   |  —
     |  —
29   |  running = running'
30   |  cost += c_min
     —
31   return cost
```

In the above example code, Algorithm 5 provides the simulated run of a job with a given set of resources. Algorithm 5 adds all job stages into a priority queue (Line 1 in Algorithm 5) and then loops until the queue is empty (Lines 7-26 in Algorithm 5). In each iteration, Algorithm 5 first checks whether there are resources available to schedule more tasks (Line 8 in Algorithm 5). If there are, then Algorithm 5 considers the highest priority stages and schedules one of their next vertices (Lines 9-19 in Algorithm 5). For a stage vertex to be scheduled, all its dependency stages (the parent stages) need to be executed before (Lines 10-14 in Algorithm 5). If all vertices of a stage have been scheduled, then the stage is removed from the queue (Lines 17-18 in Algorithm 5). Algorithm 5 simulates task progress by picking the smallest cost task and advancing all other tasks by that cost (Lines 20-26 in Algorithm 5). This minimum cost is added to the overall cost (Line 26 in Algorithm 5) and returned in the end when the queue gets empty (Line 27 in Algorithm 5). In some aspects, Algorithm 5 may ignore data skew, stage pipelining, vertex scheduling overheads, and/or other randomizations.

Figure 8:
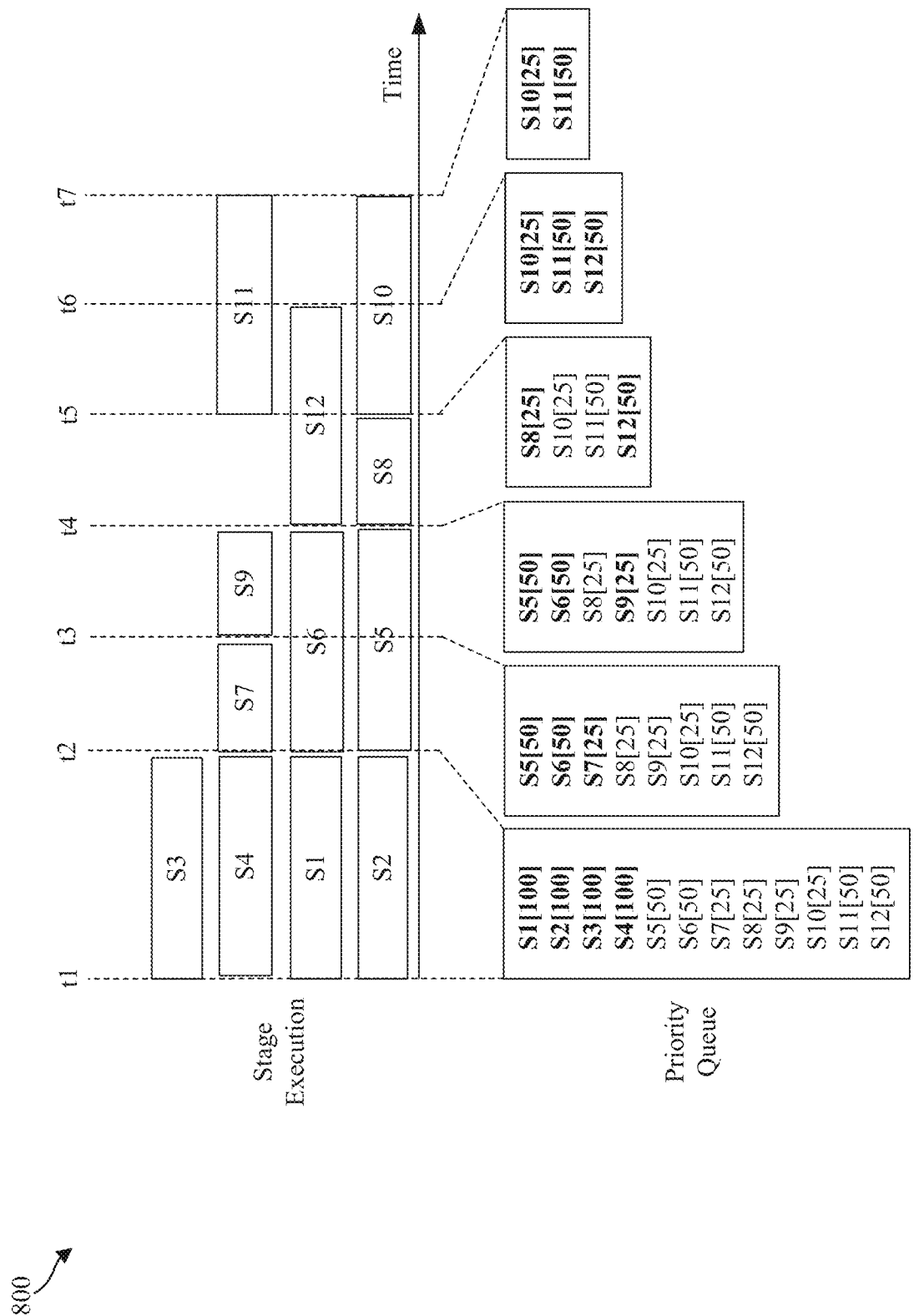
FIG. 8 is an example scheduling for the example job in FIG. 7, according to aspects of the present disclosure.

FIG. 8 is an example cost simulation 800 of Algorithm 5 over the priority-assigned stage graph of FIG. 7 for a resource allocation of 400 containers. The cost simulation 800 starts with scheduling stages S1 to S4 utilizing all 400 containers. Once these stages finish, their downstream stages S5, S5, and S6 are scheduled. Stage S9 gets scheduled as soon as stage S7 finishes. However, stage S12 which is the downstream stage of stage S7 needs to wait for stage S6 to finish. Except for the initial time interval of t1-t2, the 400 containers are not all used at the same time, and resource shaping may still be applied after resource tuning.

The present aspects are not limited to the job manager scheduling examples described herein, and are applicable to other scheduling strategies for computing the corresponding estimated costs.

Figure 9:
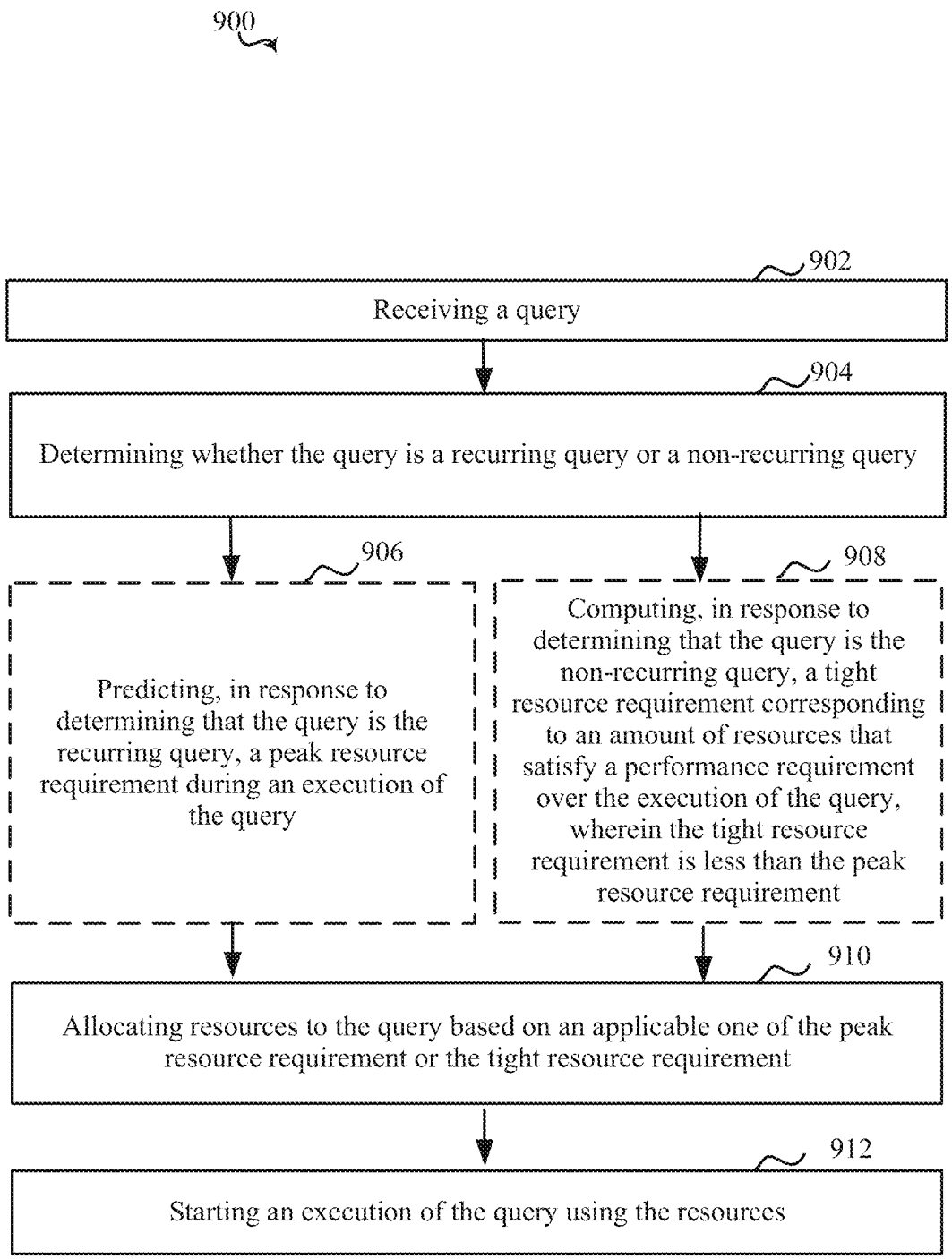
FIGS. 9 and 10 are flowcharts of example methods performed by the system of FIG. 1, according to aspects of the present disclosure.
Figure 10:
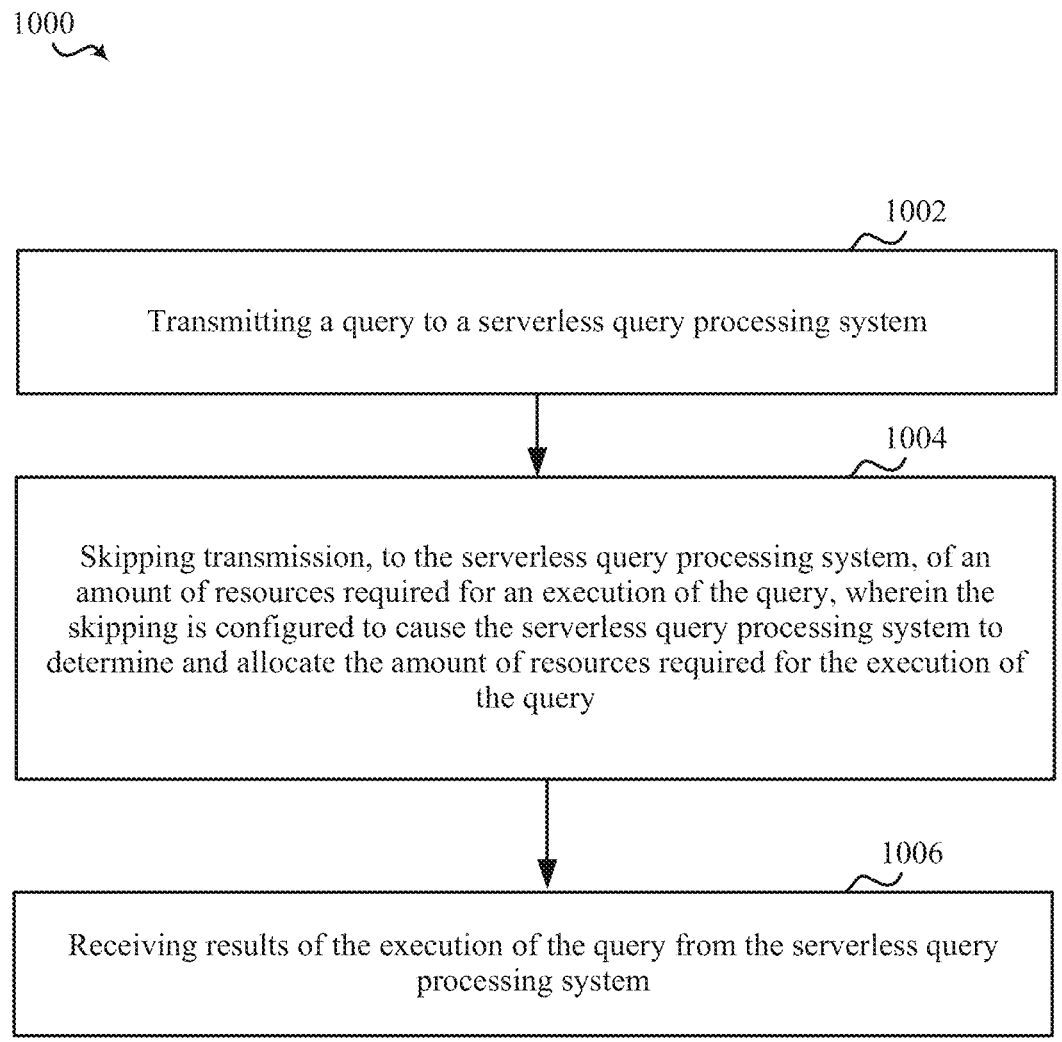

FIGS. 9 and 10 provide flowcharts of example query methods 900 and 1000 in a serverless query processing system comprising at least one processor and at least one memory, the at least one memory comprising instructions executed by the at least one processor to process queries. The following description of the example methods 900 and 1000 makes reference to the systems and components described above with reference to FIGS. 1-8 or described below with reference to FIG. 11. For example, each one of the example methods 900 and 1000 may be performed by components of the example serverless query processing system 100, and is accordingly described with reference to FIGS. 1-8, as non-limiting examples of an environment for carrying out each one of the example methods 900 and 1000. Additionally, each one of the example methods 900 and 1000 may be implemented on a computing device (see e.g., computing device 10 of FIG. 11) operating in the example serverless query processing system 100, and subcomponents of the computing device may also be described below.

Referring to FIG. 9, at 902 the method 900 includes receiving a query. For example, in the aspect of FIG. 11, the processor 4, the query component 1100, the communications component 8, and/or the user interface component 12 may receive a query. Accordingly, the processor 4, the query component 1100, the communications component 8, and/or the user interface component 12 may provide means for receiving a query. In an aspect, for example, as described above with reference to FIG. 1, the system 100 may receive a query from the user 112 (which may be a person or an application) that interacts with the system 100.

At 904 the method 900 includes determining whether the query is a recurring query or a non-recurring query. For example, in an aspect, the processor 4 and/or the query component 1100 may determine whether the query is a recurring query or a non-recurring query. Accordingly, the processor 4 and/or the query component 1100 may provide means for determining whether the query is a recurring query or a non-recurring query. In an aspect, for example, as described above with reference to FIG. 1, the system 100 may determine whether a query received from the user 112 is a recurring query or a no-recurring query. For example, the system 100 may identify recurring and non-recurring workloads from a workload repository 108 that includes query plans, stage graphs, and associated telemetry from previous job executions.

Optionally, at 906 the method 900 may include predicting, in response to determining that the query is the recurring query, a peak resource requirement during an execution of the query. For example, in an aspect, the processor 4 and/or the query component 1100 may predict, in response to determining that the query is the recurring query, a peak resource requirement during an execution of the query. Accordingly, the processor 4 and/or the query component 1100 may provide means for predicting, in response to determining that the query is the recurring query, a peak resource requirement during an execution of the query. In an aspect, for example, as described above with reference to FIG. 1, a query compiler 114 may look up the insight service 110 and load the resource predictor model for a job, and pass the compiled AST along with the predictor model to a query optimizer 116, which infers the peak resource requirement using the predictor model.

Optionally, at 908 the method 900 may include computing, in response to determining that the query is the non-recurring query, a tight resource requirement corresponding to an amount of resources that satisfy a performance requirement over the execution of the query, wherein the tight resource requirement is less than the peak resource requirement. For example, in an aspect, the processor 4 and/or the query component 1100 may compute, in response to determining that the query is the non-recurring query, a tight resource requirement corresponding to an amount of resources that satisfy a performance requirement over the execution of the query, wherein the tight resource requirement is less than the peak resource requirement. Accordingly, the processor 4 and/or the query component 1100 may provide means for computing, in response to determining that the query is the non-recurring query, a tight resource requirement corresponding to an amount of resources that satisfy a performance requirement over the execution of the query, wherein the tight resource requirement is less than the peak resource requirement. In an aspect, for example, as described above with reference to FIG. 1, for non-recurring jobs, the query optimizer 116 may invoke the resource tuner 104 that finds a tight resource allocation corresponding to an amount of resources that satisfy a performance requirement over the execution of the query. In an aspect, for example, as described above with reference to FIGS. 3A and 3C, the tight resource requirement in a tight allocation 306 is less than the peak resource requirement in a peak allocation 302.

At 910 the method 900 includes allocating resources to the query based on an applicable one of the peak resource requirement or the tight resource requirement. For example, in an aspect, the processor 4 and/or the query component 1100 may allocate resources to the query based on an applicable one of the peak resource requirement or the tight resource requirement. Accordingly, the processor 4 and/or the query component 1100 may provide means for allocating resources to the query based on an applicable one of the peak resource requirement or the tight resource requirement. In an aspect, for example, as described above with reference to FIG. 1, a job scheduler 118 may schedule a job with the applicable one of the peak resource requirement or the tight resource requirement.

At 912 the method 900 includes starting an execution of the query using the resources. For example, in an aspect, the processor 4 and/or the query component 1100 may start an execution of the query using the resources. Accordingly, the processor 4 and/or the query component 1100 may provide means for starting an execution of the query using the resources. In an aspect, for example, as described above with reference to FIG. 1, a job manager 120 may start executing the job using the allocated resources.

Optionally, determining whether the query is the recurring query or the non-recurring query at 904 may further include determining that the query is the recurring query in response to a hash of a logical query plan of the query appearing more than once in a training dataset. For example, in an aspect, the processor 4 and/or the query component 1100 may determine that the query is the recurring query in response to a hash of a logical query plan of the query appearing more than once in a training dataset. Accordingly, the processor 4 and/or the query component 1100 may provide means for determining that the query is the recurring query in response to a hash of a logical query plan of the query appearing more than once in a training dataset. In an aspect, for example, as described above with reference to FIG. 1, the system 100 uses a hash of the logical query plan of a job to identify recurring instances. In some aspects, since the inputs and the parameters may change, the system 100 may ignore the inputs and the parameters in the hash.

Optionally, predicting the peak resource requirement at 906 may further include predicting the peak resource requirement using a machine learning model that is trained using past feature values and past actual peak resource usage information of past jobs that are associated with the hash. For example, in an aspect, the processor 4 and/or the query component 1100 may predict the peak resource requirement using a machine learning model that is trained using past feature values and past actual peak resource usage information of past jobs that are associated with the hash. Accordingly, the processor 4 and/or the query component 1100 may provide means for predicting the peak resource requirement using a machine learning model that is trained using past feature values and past actual peak resource usage information of past jobs that are associated with the hash. In an aspect, for example, as described above with reference to FIG. 1, the system 100 predicts a peak allocation for recurring jobs using machine learning models built from the telemetry of past jobs.

Optionally, predicting the peak resource requirement at 906 may further include predicting the peak resource requirement using the machine learning model and feature values of the query. For example, in an aspect, the processor 4 and/or the query component 1100 may predict the peak resource requirement using the machine learning model and feature values of the query. Accordingly, the processor 4 and/or the query component 1100 may provide means for predicting the peak resource requirement using the machine learning model and feature values of the query. In an aspect, for example, as described above with reference to FIG. 1, the system 100 predicts a peak allocation for recurring jobs using machine learning models built from the telemetry of past jobs including query plans, runtime statistics, etc. For each recurring job, the system 100 may consider different data characteristics such as cardinality, plan characteristics such as parameters, and optimizer-derived characteristics such as number of partitions, plan cost, etc.

Optionally, predicting the peak resource requirement at 906 may further include predicting the peak resource requirement at compile time using the machine learning model and feature values of the query that are available at compile time. For example, in an aspect, the processor 4 and/or the query component 1100 may predict the peak resource requirement at compile time using the machine learning model and feature values of the query that are available at compile time. Accordingly, the processor 4 and/or the query component 1100 may provide means for predicting the peak resource requirement at compile time using the machine learning model and feature values of the query that are available at compile time. In an aspect, for example, as described above with reference to FIG. 1, since the peak resource requirement is predicted at compile-time, only the features that are available at compile-time for each recurring job are considered, and runtime characteristics such as actual execution time are excluded.

Optionally, the method 900 may further include, subsequent to the starting, dynamically updating the allocation of the resource for a remainder of the execution of the query based on a query execution graph of the query. For example, in an aspect, the processor 4 and/or the query component 1100 may, subsequent to the starting, dynamically update the allocation of the resource for a remainder of the execution of the query based on a query execution graph of the query. Accordingly, the processor 4 and/or the query component 1100 may provide means for, subsequent to the starting, dynamically updating the allocation of the resource for a remainder of the execution of the query based on a query execution graph of the query. In an aspect, for example, as described above with reference to FIG. 1, once a job starts executing, the job manager 120 may invoke the resource shaper 106, and in case of excess resources, releases the excess resources via the job scheduler 118. The system 100 may dynamically adapt the allocations based on the query execution graph.

Optionally, the method 900 may further include re-computing the applicable one of the peak resource requirement or the tight resource requirement based on the query execution graph; and releasing any excess resources. For example, in an aspect, the processor 4 and/or the query component 1100 may re-compute the applicable one of the peak resource requirement or the tight resource requirement based on the query execution graph; and release any excess resources. Accordingly, the processor 4 and/or the query component 1100 may provide means for re-computing the applicable one of the peak resource requirement or the tight resource requirement based on the query execution graph; and releasing any excess resources. In an aspect, for example, as described above with reference to FIG. 1, once a job starts executing, the job manager 120 may invoke the resource shaper 106, and in case of excess resources, releases the excess resources via the job scheduler 118. In an aspect, for example, as described above with reference to FIG. 1, the system 100 re-computes a new peak or tight allocation expected for the remainder of the query as the query execution progresses. At any time, if the newer computed allocation is lower than the current allocation, the system 100 releases the excess resources.

Optionally, the re-computing may further include converting the query execution graph into one or more trees by removing one edge from output edges of each operator that has more than one consumer; and computing a maximum remaining peak resource requirement by computing a maximum width of each tree and summing the maximum width of all trees. For example, in an aspect, the processor 4 and/or the query component 1100 may convert the query execution graph into one or more trees by removing one edge from output edges of each operator that has more than one consumer; and compute a maximum remaining peak resource requirement by computing a maximum width of each tree and summing the maximum width of all trees. Accordingly, the processor 4 and/or the query component 1100 may provide means for converting the query execution graph into one or more trees by removing one edge from output edges of each operator that has more than one consumer; and computing a maximum remaining peak resource requirement by computing a maximum width of each tree and summing the maximum width of all trees. In an aspect, for example, as described above with reference to FIG. 1, the resource shaper 106 may estimate the peak resources for the remaining of the job by converting a job graph into one or more trees. For example, the resource shaper 106 may perform "tree-ification" by removing one of the output edges of the Spool operators in the job graph, since Spool is the only operator that may have more than one consumers. In an aspect, for example, as described above with reference to FIG. 5, at each particular point in execution, the resource shaper 106 may compute the maximum remaining peak resource requirement by computing the maximum width of each of the trees 514, which is 30, 50, and 50 respectively, and then takes the sum of the individual tree widths, e.g., 130.

Optionally, computing the tight resource requirement at 908 may further include computing the tight resource requirement that corresponds to a minimum amount of resources that satisfy the performance requirement over the execution of the query. For example, in an aspect, the processor 4 and/or the query component 1100 may compute the tight resource requirement that corresponds to a minimum amount of resources that satisfy the performance requirement over the execution of the query. Accordingly, the processor 4 and/or the query component 1100 may provide means for computing the tight resource requirement that corresponds to a minimum amount of resources that satisfy the performance requirement over the execution of the query. In an aspect, for example, as described above with reference to FIG. 1, for non-recurring jobs (e.g., ad-hoc jobs, non-SLA jobs, etc.), the system 100 computes a tight allocation which is the minimum possible allocation that does not cause noticeable degradation in performance.

Optionally, computing the tight resource requirement at 908 may further include estimating a sequence of vertex executions in a query execution graph of the query by simulating a job scheduler; and starting with an initial set of resources, iteratively finding an alternative resource allocation that decreases an area of a resource-cost rectangle circumscribing a resource-cost curve of the execution of the query while keeping cost and resource overheads within a threshold. For example, in an aspect, the processor 4 and/or the query component 1100 may estimate a sequence of vertex executions in a query execution graph of the query by simulating a job scheduler; and starting with an initial set of resources, iteratively find an alternative resource allocation that decreases an area of a resource-cost rectangle circumscribing a resource-cost curve of the execution of the query while keeping cost and resource overheads within a threshold. Accordingly, the processor 4 and/or the query component 1100 may provide means for estimating a sequence of vertex executions in a query execution graph of the query by simulating a job scheduler; and starting with an initial set of resources, iteratively finding an alternative resource allocation that decreases an area of a resource-cost rectangle circumscribing a resource-cost curve of the execution of the query while keeping cost and resource overheads within a threshold. In an aspect, for example, as described above with reference to FIGS. 6A, 6B, and 6C, the resource tuner 106 attempts to decrease the total area of the resource-cost rectangle 608. Specifically, the resource tuner 104 simulates the job scheduler 118 to estimate the same sequence of vertex executions as would happen in the real environment, including starting with an initial set of resources and iteratively finding the alternate resource allocation that would improve the area of the resource-cost rectangle 608 while keeping cost and resource overheads within a threshold.

Optionally, computing the tight resource requirement at 908 may further include assigning priorities to each stage in the query execution graph of the query, wherein a priority assigned to a stage is one more than a maximum priority assigned to child stages of the stage. For example, in an aspect, the processor 4 and/or the query component 1100 may assign priorities to each stage in the query execution graph of the query, wherein a priority assigned to a stage is one more than a maximum priority assigned to child stages of the stage. Accordingly, the processor 4 and/or the query component 1100 may provide means for assigning priorities to each stage in the query execution graph of the query, wherein a priority assigned to a stage is one more than a maximum priority assigned to child stages of the stage. In an aspect, for example, as described above with reference to FIGS. 6A, 6B, and 6C, the resource tuner 106 assigns a priority of zero (e.g., most important) to the leaf stages, and all other stages are assigned a priority of one more than the maximum priority of any respective child stages. Such a priority assignment ensures that all child stages have been executed before the parent stage starts executing. In an aspect, for example, as described above with reference to FIG. 7, the resource tuner 104 may perform priority assignment over the example job graph 500 in FIG. 5, starting from a priority zero for all input stages 516 and ending with a priority 3 for all output stages 518.

Optionally, computing the tight resource requirement at 908 may further include queuing stages of the query execution graph of the query in a priority queue based on the priorities. For example, in an aspect, the processor 4 and/or the query component 1100 may queue stages of the query execution graph of the query in a priority queue based on the priorities. Accordingly, the processor 4 and/or the query component 1100 may provide means for queueing stages of the query execution graph of the query in a priority queue based on the priorities. In an aspect, for example, as described above with reference to FIG. 7, the resource tuner 104 may estimate the cost of a job with different resource allocations by simulating the execution of different stages in the job manager 120. For example, in an aspect, the resource tuner 104 may put all stages, along with their priorities in a priority queue.

Optionally, computing the tight resource requirement at 908 may further include processing the priority queue comprising scheduling any stages at a top of the priority queue based on an availability of resources. For example, in an aspect, the processor 4 and/or the query component 1100 may process the priority queue comprising scheduling any stages at a top of the priority queue based on an availability of resources. Accordingly, the processor 4 and/or the query component 1100 may provide means for processing the priority queue comprising scheduling any stages at a top of the priority queue based on an availability of resources. In an aspect, for example, as described above with reference to FIG. 7, the resource tuner 104 may schedule the stage at the top of the queue as soon as resources are available.

Optionally, computing the tight resource requirement at 908 may further include, for each candidate resource allocation, estimating a cost of the processing of the priority queue. For example, in an aspect, the processor 4 and/or the query component 1100 may, for each candidate resource allocation, estimate a cost of the processing of the priority queue. Accordingly, the processor 4 and/or the query component 1100 may provide means for, for each candidate resource allocation, estimating a cost of the processing of the priority queue. In an aspect, for example, as described above with reference to FIG. 8, the resource tuner 104 may implement cost simulation 800 over the priority-assigned stage graph of FIG. 7 for a resource allocation of 400 containers.

Referring to FIG. 10, at 1002 the method 1000 includes transmitting a query to a serverless query processing system. For example, in the aspect of FIG. 11, the processor 4, the query component 1100, the communications component 8, and/or the user interface component 12 may transmit a query to a serverless query processing system. Accordingly, the processor 4, the query component 1100, the communications component 8, and/or the user interface component 12 may provide means for transmitting a query to a serverless query processing system. In an aspect, for example, as described above with reference to FIG. 1, a user 112 (which may be a person or an application) that interacts with the system 100 may send a query to the system 100.

At 1004 the method 1000 includes skipping transmission, to the serverless query processing system, of an amount of resources required for an execution of the query, wherein the skipping is configured to cause the serverless query processing system to determine and allocate the amount of resources required for the execution of the query. For example, in an aspect, the processor 4, the query component 1100, the communications component 8, and/or the user interface component 12 may skip transmission, to the serverless query processing system, of an amount of resources required for an execution of the query, wherein the skipping is configured to cause the serverless query processing system to determine and allocate the amount of resources required for the execution of the query. Accordingly, the processor 4, the query component 1100, the communications component 8, and/or the user interface component 12 may provide means for skipping transmission, to the serverless query processing system, of an amount of resources required for an execution of the query, wherein the skipping is configured to cause the serverless query processing system to determine and allocate the amount of resources required for the execution of the query. In an aspect, for example, as described above with reference to FIG. 1, the user 112 may not indicate the amount of resources required for the execution of the query. Instead, the system 100 may determine whether a query received from the user 112 is a recurring query or a no-recurring query. Further, a query compiler 114 may look up the insight service 110 and load the resource predictor model for a job, and pass the compiled AST along with the predictor model to a query optimizer 116, which infers the peak resource requirement using the predictor model. For non-recurring jobs, the query optimizer 116 may invoke the resource tuner 104 that finds a tight resource allocation corresponding to an amount of resources that satisfy a performance requirement over the execution of the query.

At 1006 the method 1000 includes receiving results of the execution of the query from the serverless query processing system. For example, in an aspect, the processor 4, the query component 1100, the communications component 8, and/or the user interface component 12 may receive results of the execution of the query from the serverless query processing system. Accordingly, the processor 4, the query component 1100, the communications component 8, and/or the user interface component 12 may provide means for receiving results of the execution of the query from the serverless query processing system. In an aspect, for example, as described above with reference to FIG. 1, a job scheduler 118 schedules the job with the peak resource requirement, and a job manager 120 outputs the results which may be provided back to the user 112.

Optionally, the method 1000 may further include transmitting, to the serverless query processing system, a selection of a mode of operation for the serverless query processing system to determine and allocate the amount of resources required for the execution of the query. For example, in an aspect, the processor 4, the query component 1100, the communications component 8, and/or the user interface component 12 may transmit, to the serverless query processing system, a selection of a mode of operation for the serverless query processing system to determine and allocate the amount of resources required for the execution of the query. Accordingly, the processor 4, the query component 1100, the communications component 8, and/or the user interface component 12 may provide means for transmitting, to the serverless query processing system, a selection of a mode of operation for the serverless query processing system to determine and allocate the amount of resources required for the execution of the query. In an aspect, for example, as described above with reference to FIG. 1, the system 100 may provide compiler flags where the users 112 may choose to explicitly opt-in or opt-out of resource optimization on a per job basis.

Optionally, transmitting the selection of the mode of operation may further include indicating to the serverless query processing system whether to adaptively change the amount of resources during the execution of the query. For example, in an aspect, the processor 4, the query component 1100, the communications component 8, and/or the user interface component 12 may indicate to the serverless query processing system whether to adaptively change the amount of resources during the execution of the query. Accordingly, the processor 4, the query component 1100, the communications component 8, and/or the user interface component 12 may provide means for indicating to the serverless query processing system whether to adaptively change the amount of resources during the execution of the query. In an aspect, for example, as described above with reference to FIGS. 1 and 3B, the user 112 may select the adaptive allocation 304.

Thus, the described apparatus and methods introduce a novel way for serverless query processing optimization.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 11:
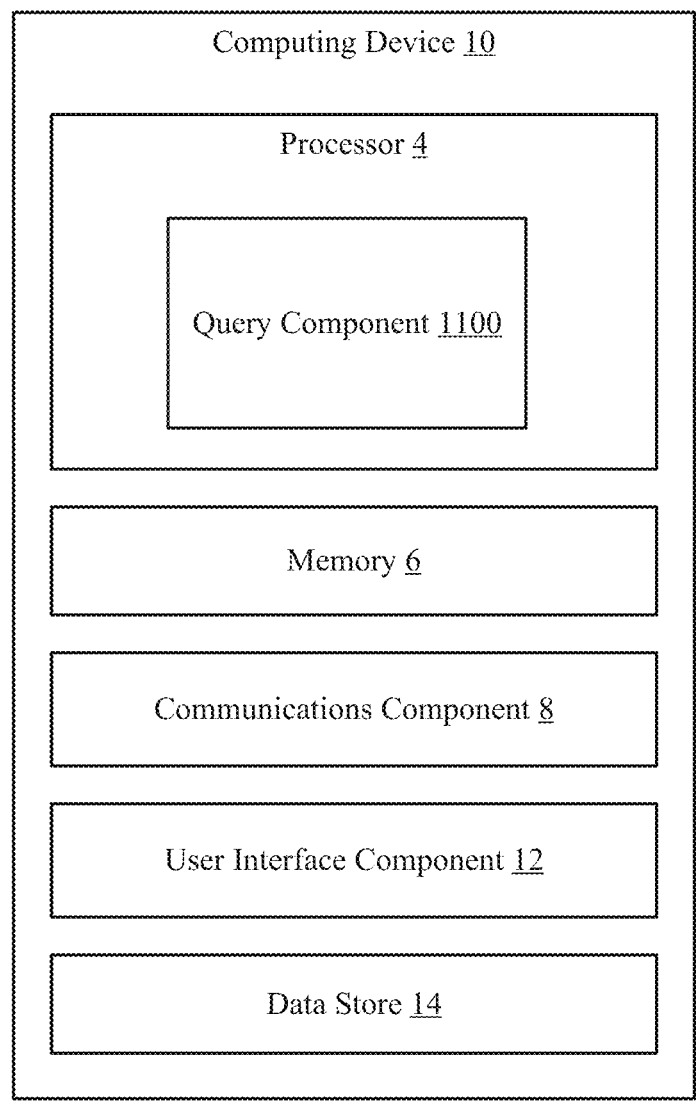
FIG. 11 is a block diagram of an example computer system on which the disclosed systems and methods can be implemented, according to aspects of the present disclosure.

FIG. 11 illustrates an example computing device 10 including additional optional component details as those shown in FIG. 1. In an example, the computing device 10 may include a processor 4 for carrying out processing functions associated with one or more of components and functions described herein. The processor 4 may include a single or multiple set of processors or multi-core processors. Moreover, the processor 4 may be implemented as an integrated processing system and/or a distributed processing system. In an aspect, for example, the processor 4 may perform the function of a query component 1100 which may be configured to perform the function of any component described above, such as the user 112, the resource predictor 102, the resource tuner 104, the resource shaper 106, the workload insights service 110, the query compiler 114, the query optimizer 116, the job scheduler 118, the job manager 120, or any other component described above.

The computing device 10 may further include memory 6, such as for storing local versions of applications being executed by the processor 4, related instructions, parameters, etc. The memory 6 may include a type of memory usable by a computer, such as random access memory (RAM), read only memory (ROM), tapes, magnetic discs, optical discs, volatile memory, non-volatile memory, and any combination thereof. Additionally, the processor 4 and the memory 6 may include and execute an operating system executing on the processor 4, one or more applications, display drivers, etc., as described herein, and/or other components of the computing device 10.

Further, the computing device 10 may include a communications component 8 that provides for establishing and maintaining communications with one or more other devices, parties, entities, etc. utilizing hardware, software, and services as described herein. The communications component 8 may carry communications between components on the computing device 10, as well as between the computing device 10 and external devices, such as devices located across a communications network and/or devices serially or locally connected to the computing device 10. For example, the communications component 8 may include one or more buses, and may further include transmit chain components and receive chain components associated with a wireless or wired transmitter and receiver, respectively, operable for interfacing with external devices.

Additionally, the computing device 10 may include a data store 102, which can be any suitable combination of hardware and/or software, that provides for mass storage of information, databases, and programs employed in connection with examples described herein. For example, a data store 14 may be or may include a data repository for applications and/or related parameters not currently being executed by processor 4. In addition, the data store 14 may be a data repository for an operating system, application, display driver, etc., executing on the processor 4, and/or one or more other components of the computing device 10.

The computing device 10 may also include a user interface component 12 operable to receive inputs from a user of the computing device 10 and further operable to generate outputs for presentation to the user (e.g., via a display interface to a display device). The user interface component 12 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 12 may include one or more output devices, including but not limited to a display interface, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method in a query system comprising at least one processor and at least one memory, the at least one memory comprising instructions executed by the at least one processor to run queries, the method comprising:
    transmitting a query to a serverless query processing system;
    skipping transmission, to the serverless query processing system, of an amount of resources required for an execution of the query, wherein the skipping is configured to cause the serverless query processing system to determine and allocate the amount of resources required for the execution of the query; and
    receiving results of the execution of the query from the serverless query processing system.

2. The method of claim 1, further comprising:
    transmitting, to the serverless query processing system, a selection of a mode of operation for the serverless query processing system to determine and allocate the amount of resources required for the execution of the query.

3. The method of claim 2, wherein transmitting the selection of the mode of operation comprises indicating to the serverless query processing system whether to adaptively change the amount of resources during the execution of the query.

4. The method of claim 1,
    wherein the query is a recurring query or a non-recurring query;
    wherein a peak resource requirement during execution of the query is associated with the recurring query;
    wherein a tight resource requirement is associated with the non-recurring query, the tight resource requirement corresponding to an amount of resources that satisfy a performance requirement over the execution of the query, and the tight resource requirement being less than the peak resource requirement; and
    wherein the query is executable using resources allocated based on an applicable one of the peak resource requirement or the tight resource requirement.

5. The method of claim 4, wherein a hash of a logical query plan of the query appears more than once in a training dataset, which indicates to the serverless query processing system that the query is a recurring query.

6. The method of claim 5, wherein the hash of the logical query plan is associated with past feature values and past actual peak resource usage information of past jobs used to train a machine learning model configured to predict the peak resource requirement.

7. The method of claim 6, wherein the query includes feature values configured to be used by the machine learning model to predict the peak resource requirement.

8. The method of claim 6, wherein the query includes feature values configured to be used by the machine learning model at compile time to predict the peak resource requirement.

9. The method of claim 4, wherein the query is associated with a query execution graph configured to be used by a machine learning model, subsequent to a start of the execution of the query, to dynamically update the allocation for the resources for a remainder of the execution of the query.

10. The method of claim 9, wherein the query execution graph associated with the query is configured to enable re-computing of the applicable one of the peak resource requirement or the tight resource requirement, and releasing any excess resources.

11. The method of claim 10, wherein the query execution graph is configured to be converted into one or more trees by removing one edge from output edges of each operator that has more than one consumer, and a maximum remaining peak resource requirement is determinable by computing a maximum width of each tree and summing the maximum width of all trees.

12. The method of claim 4, wherein the tight resource requirement corresponds to a minimum amount of resources that satisfy the performance requirement over the execution of the query.

13. The method of claim 4, wherein the tight resource requirement is determinable by:
    estimating a sequence of vertex executions in a query execution graph of the query by simulating a job scheduler; and
    starting with an initial set of resources, iteratively finding an alternative resource allocation that decreases an area of a resource-cost rectangle circumscribing a resource-cost curve of the execution of the query while keeping cost and resource overheads within a threshold.

14. The method of claim 13, wherein the tight resource requirement is further determinable by:
    assigning priorities to each stage in the query execution graph of the query, wherein a priority assigned to a stage is one more than a maximum priority assigned to child stages of the stage;
    queuing stages of the query execution graph of the query in a priority queue based on the priorities;
    processing the priority queue comprising scheduling any stages at a top of the priority queue based on an availability of resources; and
    for each candidate resource allocation, estimating a cost of the processing of the priority queue.

15. A device comprising:
    at least one processor; and at least one memory in communication with the at least one processor, wherein the at least one memory comprises instructions executed by the at least one processor to process queries including:
- transmitting a query to a serverless query processing system;
- skipping transmission, to the serverless query processing system, of an amount of resources required for an execution of the query, wherein the skipping is configured to cause the serverless query processing system to determine and allocate the amount of resources required for the execution of the query; and
- receiving results of the execution of the query from the serverless query processing system.

16. The device of claim 15, wherein the at least one processor is further configured to transmit, to the serverless query processing system, a selection of a mode of operation for the serverless query processing system to determine and allocate the amount of resources required for the execution of the query.

17. The device of claim 16, wherein, in order to transmit the selection of the mode of operation, the at least one processor is configured to indicate to the serverless query processing system whether to adaptively change the amount of resources during the execution of the query.

18. A non-transitory computer-readable medium storing instructions that, when executed by at least one processor, cause the at least one processor to:
- transmit a query to a serverless query processing system;
- skip transmission, to the serverless query processing system, of an amount of resources required for an execution of the query, wherein the skipping is configured to cause the serverless query processing system to determine and allocate the amount of resources required for the execution of the query; and
- receive results of the execution of the query from the serverless query processing system.

19. The non-transitory computer-readable medium of claim 18, wherein the instructions further cause the at least one processor to transmit, to the serverless query processing system, a selection of a mode of operation for the serverless query processing system to determine and allocate the amount of resources required for the execution of the query.

20. The non-transitory computer-readable medium of claim 19, wherein, in order to transmit the selection of the mode of operation, the instructions cause the at least one processor to indicate to the serverless query processing system whether to adaptively change the amount of resources during the execution of the query.

* * * * *